(12) United States Patent
Depallens et al.

(10) Patent No.: US 9,042,589 B2
(45) Date of Patent: May 26, 2015

(54) CUSTOM FIT IN-EAR MONITORS UTILIZING A SINGLE PIECE DRIVER MODULE

(71) Applicant: Logitech Europe, S.A., Lausanne (CH)

(72) Inventors: Philippe Depallens, San Clemente, CA (US); Joseph A. Saggio, Jr., Anaheim Hills, CA (US)

(73) Assignee: Logitech Europe, S.A., Lausanne (CH)

( * ) Notice: Subject to any disclaimer, the term of this patent is extended or adjusted under 35 U.S.C. 154(b) by 48 days.

(21) Appl. No.: 14/061,885

(22) Filed: Oct. 24, 2013

(65) Prior Publication Data

US 2015/0117694 A1  Apr. 30, 2015

(51) Int. Cl.
*H04R 25/00* (2006.01)
*H04R 1/10* (2006.01)

(52) U.S. Cl.
CPC ............ *H04R 25/604* (2013.01); *H04R 1/1091* (2013.01); *H04R 2460/00* (2013.01)

(58) Field of Classification Search
CPC .... H04R 25/48; H04R 25/604; H04R 25/608; H04R 1/1075; H04R 2225/023; H04R 2225/025; H04R 2225/59; H04R 2225/77
See application file for complete search history.

(56) References Cited

U.S. PATENT DOCUMENTS

2007/0036385 A1* 2/2007 Harvey et al. ................. 381/388

* cited by examiner

*Primary Examiner* — Matthew Eason
(74) *Attorney, Agent, or Firm* — Patent Law Office of David G. Beck

(57) ABSTRACT

A custom-fit in-ear-monitor (IEM) is provided that utilizes a plurality of drivers and a single piece driver module that significantly simplifies fabrication while insuring that the completed IEM achieves the desired acoustic performance. The driver module, which is fit within a custom-fit ear mold shell, includes a plurality of driver ports to which the drivers are coupled. The driver module also includes an acoustic output member that includes one or more sound bores that acoustically couple the acoustic output surface of the custom-fit ear mold shell to the plurality of driver ports via a plurality of sound ducts within the driver module.

62 Claims, 16 Drawing Sheets

CUSTOM FIT IN-EAR MONITORS UTILIZING A SINGLE PIECE DRIVER MODULE

FIELD OF THE INVENTION

The present invention relates generally to audio monitors and, more particularly, to an in-ear multi-driver earpiece design optimized for manufacturability.

BACKGROUND OF THE INVENTION

In-ear monitors, also referred to as IEMs, canal phones and stereo earphones, are commonly used to listen to both recorded and live music. A typical recorded music application would involve plugging a pair of monitors into a music player such as a CD player, flash or hard drive based MP3 player, home stereo or similar device using the device's headphone socket. Alternately, the monitors can be wirelessly coupled to the music player. In a typical live music application, the on-stage musician uses the monitors in order to hear his or her own music during a performance. In this case, the monitor is either plugged into a wireless belt pack receiver or directly connected to an audio distribution device such as a mixer or a headphone amplifier. This type of monitor offers numerous advantages over the use of stage loudspeakers, including improved gain-before-feedback, minimization/elimination of room/stage acoustic effects, cleaner mix through the minimization of stage noise, increased mobility for the musician and the reduction of ambient sounds. Many of these same advantages may be gained by an audience member using in-ear monitors to listen to a live performance.

In-ear monitors are quite small and are normally worn just outside the ear canal. As a result, the acoustic design of the monitor must lend itself to a very compact design utilizing small components. Some monitors are custom fit (i.e., custom molded) while others use a generic "one-size-fits-all" earpiece. Generic earpieces may include a removable and replaceable eartip sleeve that provides a limited degree of customization, e.g., choice of color, size, material and shape.

Prior art in-ear monitors use either diaphragm-based receivers, armature-based receivers, or a combination of the two. Broadly characterized, a diaphragm is a moving-coil speaker with a paper or mylar diaphragm. Since the cost to manufacture a diaphragm is relatively low, they are widely used in many common audio products (e.g., ear buds). In contrast to the diaphragm approach, an armature receiver utilizes a piston design. Due to the inherent cost of armature receivers, however, they are typically only found in hearing aids and high-end in-ear monitors.

Diaphragm receivers, due to the use of moving-coil speakers, suffer from several limitations. First, because of the size of the diaphragm assembly, a typical earpiece is limited to a single diaphragm. This limitation precludes achieving optimal frequency response (i.e., a flat or neutral response) through the inclusion of multiple diaphragms. Second, diaphragm-based monitors have significant frequency roll off above 4 kHz. As the desired upper limit for the frequency response of a high-fidelity monitor is at least 15 kHz, diaphragm-based monitors cannot achieve the desired upper frequency response while still providing accurate low frequency response.

Armatures, also referred to as balanced armatures, were originally developed by the hearing aid industry. This type of driver uses a magnetically balanced shaft or armature within a small, typically rectangular, enclosure. As a result of this design, armature drivers are not reliant on the size and shape of the enclosure, i.e., the ear canal, for tuning as is the case with diaphragm-based monitors. Typically, the length of tubing attached to the armature in combination with an acoustic filter is used to tune the armature. A single armature is capable of accurately reproducing low-frequency audio or high-frequency audio, but incapable of providing high-fidelity performance across all frequencies.

To overcome the limitations associated with both diaphragm and armature drivers, some in-ear monitors use either a combination of both diaphragm and armature drivers or multiple armatures. In such a multi-driver arrangement, a crossover network is used to divide the frequency spectrum into multiple regions, i.e., low and high or low, medium, and high. Separate, optimized drivers are then used for each acoustic region. Generally either a single delivery tube or a pair of delivery tubes delivers the sound produced by the drivers to the output face of the earpiece.

As briefly described above, a variety of techniques are typically used to tune driver output as well as achieve the desired IEM acoustic performance for a specific set of IEMs, these techniques including optimization of driver placement, tubing diameter and length, damper/filter selection, and port placement and size. In general, these techniques are integrated into the fabrication process used to manufacture a pair of molded in-ear monitors. While these techniques may be used to successfully achieve the desired performance, due to the labor intensive nature of these processes both IEM cost and manufacturing time are dramatically affected. Accordingly, what is needed is an IEM manufacturing technique that reduces fabrication complexity while still achieving the requisite acoustic performance. The present invention provides such an IEM manufacturing technique.

SUMMARY OF THE INVENTION

A custom-fit in-ear-monitor (IEM) is provided that utilizes a plurality of drivers and a single piece driver module that significantly simplifies fabrication while insuring that the resulting IEM achieves the desired acoustic performance. The driver module includes a plurality of driver ports as well as an acoustic output member. At least one, and preferably more than one of the driver ports is comprised of a hollow member extending away from the body of the driver module. One or more of the driver ports may be acoustically coupled to the ambient environment. The single piece driver module, which is configured to fit within a custom-fit ear mold shell, may be fabricated entirely out of a pliable material (e.g., an elastomeric material such as silicone, neoprene, ethylene propylene diene monomer, nitrile rubber, nitrile, polyvinyl chloride, nitrile/PVC blends, or urethane) or the body portion may be fabricated from a rigid material (e.g., plastic) while the acoustic output member and the driver port member(s) may be fabricated from a pliable material (e.g., silicone, neoprene, ethylene propylene diene monomer, nitrile rubber, nitrile, polyvinyl chloride, nitrile/PVC blends, or urethane). A faceplate may be configured to close an opening in the custom-fit ear mold shell, where the faceplate is attached to the shell after insertion of the driver module and incorporated drivers. One or more of the driver ports may also be comprised of a cavity formed within the body of the driver module, the cavity configured to accept at least a portion of at least one of the coupled drivers. The acoustic output member of the driver module includes at least one, and preferably two, sound bores that acoustically couple the acoustic output surface of the custom-fit ear mold shell to the plurality of driver ports via a plurality of sound ducts within the driver module. When the acoustic output member includes two sound bores, the two sound bores may or may not be concentric, may or may not have a circular cross-section, and may or may not have the same cross-sectional shape or diameter. When the acoustic output member includes two sound bores, preferably one driver port is acoustically coupled to one of the two sound bores while the remaining driver ports are acoustically coupled to the second of the two sound bores. The custom-fit IEM of the invention also includes a crossover circuit disposed within the custom-fit ear mold shell and electrically coupled to the plurality of drivers, where the crossover circuit is configured to receive an electrical signal from an audio source that is external to the custom-fit IEM and to provide separate input signals to each of the plurality of drivers based on the electrical signal. The crossover circuit may be integrated into a cable socket integrated into the custom-fit ear mold shell or fabricated on a printed circuit board (PCB). The PCB containing the crossover circuit may be at least partially housed within a cavity formed on the driver module, or attached to a surface of the driver module using mounting clips or barbed stand-offs. A cable socket may be integrated into the custom-fit ear mold, where a source input cable coupleable to the audio source is attached to the custom-fit IEM and to the crossover circuit via the cable socket. The provided custom-fit IEM may also include a filler disposed within the custom-fit ear mold, the filler capturing and holding the single piece driver module, the drivers and the crossover circuit within the custom-fit ear mold shell. The provided custom-fit IEM may also include at least one locking feature, such as a barb integrated onto an outer surface of the acoustic output member, which is configured to capture and hold the driver module within the custom-fit ear mold shell. The provided custom-fit IEM may also include an acoustic output extension that is slidably mounted to the driver module's acoustic output member and that is adjustable between a non-extended position and an extended position.

In another aspect of the invention, an IEM driver component configured to fit within an IEM shell is provided, where the IEM driver component is comprised of a single piece driver module that includes a plurality of driver ports configured to be coupled to a plurality of drivers as well as an acoustic output member that includes at least one sound bore configured to be acoustically coupled to an acoustic output surface of the IEM shell. At least one, and preferably more than one, of the driver ports is comprised of a hollow member extending away from the body of the driver module. One or more of the driver ports may also be comprised of a cavity formed within the body of the driver module, the cavity configured to accept at least a portion of a driver. The acoustic output member of the driver module includes at least one, and preferably two, sound bores that are acoustically coupled to the plurality of driver ports via a plurality of sound ducts within the driver module. The single piece driver module may be fabricated entirely out of a pliable material (e.g., an elastomeric material such as silicone, neoprene, ethylene propylene diene monomer, nitrile rubber, nitrile, polyvinyl chloride, nitrile/PVC blends, or urethane) or the body portion may be fabricated from a rigid material (e.g., plastic) while the acoustic output member and the driver port member(s) may be fabricated from a pliable material (e.g., silicone, neoprene, ethylene propylene diene monomer, nitrile rubber, nitrile, polyvinyl chloride, nitrile/PVC blends, or urethane). The single piece driver module may also include at least one locking feature integrated onto an outer surface of the driver module which is configured to capture and hold the driver module within an IEM shell. The single piece driver module may also include an acoustic output extension that is slidably mounted to the driver module's acoustic output member and that is adjustable between a non-extended position and an extended position. The single piece driver module may be further configured by blocking off one or more of the driver ports.

A further understanding of the nature and advantages of the present invention may be realized by reference to the remaining portions of the specification and the drawings.

DESCRIPTION OF THE SPECIFIC EMBODIMENTS

In the following text, the terms "in-ear monitor", "IEM", "monitor", "canal phone", "earbud" and "earphone" may be used interchangeably. Similarly, the terms "custom" IEM, "custom fit" IEM and "molded" IEM may be used interchangeably and refer to an IEM that is molded to fit within the ear of a specific user. Similarly, the terms "sound delivery tube", "sound delivery bore", "sound bore" and "sound duct" may be used interchangeably. Unless otherwise noted, the term "driver" as used herein refers to either an armature driver or a diaphragm driver. It should be understood that identical element symbols used on multiple figures refer to the same component, or components of equal functionality. Additionally, the accompanying figures are only meant to illustrate, not limit, the scope of the invention and should not be considered to be to scale.

Figure 1:
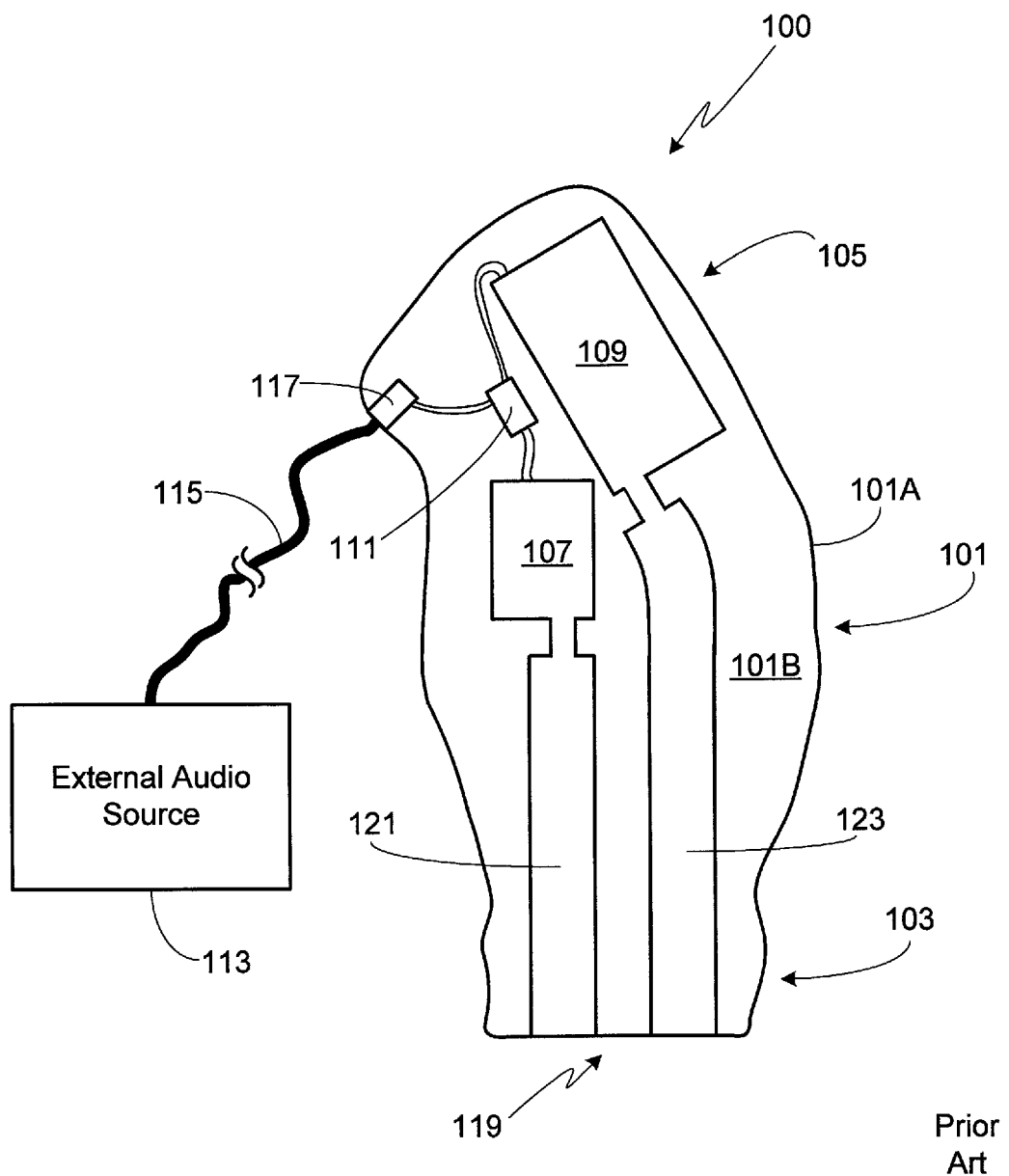
FIG. 1 illustrates the primary elements of a custom fit in-ear monitor according to the prior art.

FIG. 1 illustrates the primary elements of a custom fit in-ear monitor 100 according to the prior art. Being a custom fit IEM, enclosure 101 of monitor 100 is molded or otherwise custom fit to a particular ear of a specific end user. In general, enclosure 101 includes an outer shell 101A based on a mold of the end user's ear and an inner filler 101B that is added after the various drivers, tubing, dampers, and circuitry are installed, positioned and tuned to achieve the desired IEM acoustic performance. Enclosure 101 includes an ear canal portion 103 designed to fit within the outer ear canal of the user and an concha portion 105 designed to fit within the concha portion of the ear. In the illustrated example, monitor 100 includes a pair of armature drivers 107 and 109, driver 107 being a low-frequency driver and driver 109 being a high-frequency driver. A circuit, such as a passive crossover circuit or an active crossover circuit, mounted on a circuit board 111 provides input to armature drivers 107 and 109. Circuit 111, and therefore IEM 100, is coupled to an external audio source 113 via a cable 115, cable 115 transmitting electrical signals from audio source 113 to circuit 111, the electrical signals representative of the sound to be produced by IEM 100. Cable 115 is either hard-wired to IEM 100, or electrically connected to IEM 100 via a cable socket 117 that is integrated within enclosure 101. As used herein, the term "external audio source" refers to any of a variety of possible audio sources, all of which are external and independent of the IEM to which they are attached, and all of which produce electrical signals that are representative of the sound to be generated by the IEM. This is in distinct contrast to a hearing aid in which the audio source, i.e., one or more microphones and typically an audio amplifier/sound processor, is integrated within the hearing aid. Thus while a hearing aid allows the user to listen to an external source of sound by converting the acoustic sound source to an electrical signal with the internal microphone and audio processor, the hearing aid itself is not coupled to the external audio source. Exemplary external audio sources include, but are not limited to, audio receivers, audio mixers, music players, headphone amplifiers, DVD players, cellular telephones, and handheld electronic gaming devices. As is well known in the industry, in-ear monitor 100 may also include a wireless receiver (e.g., a Bluetooth receiver) or be coupled to a wireless receiver via cable 115, thus allowing IEM 100 to wirelessly receive electrical signals representative of the audio source from the combination of a wireless transmitter and the external audio source.

The output from drivers 107 and 109 is delivered to the end surface 119 of the IEM via a pair of delivery tubes 121 and 123, respectively. Typical dimensions for sound delivery tubes, such as tubes 121 and 123, are an inside diameter (ID) of 1.9 millimeters and an outside diameter (OD) of 2.95 millimeters. Given that end surface 119 of a custom fit earpiece is approximately 9 millimeters by 11 millimeters, it is clear that such earpieces are sufficiently large for dual sound tubes. It will be appreciated that while sound delivery tubes 121 and 123 are shown as being straight, or substantially straight, IEM 100 will often use curved tubes to accommodate the contours of the ear canal to which the IEM is fit.

Figure 2:
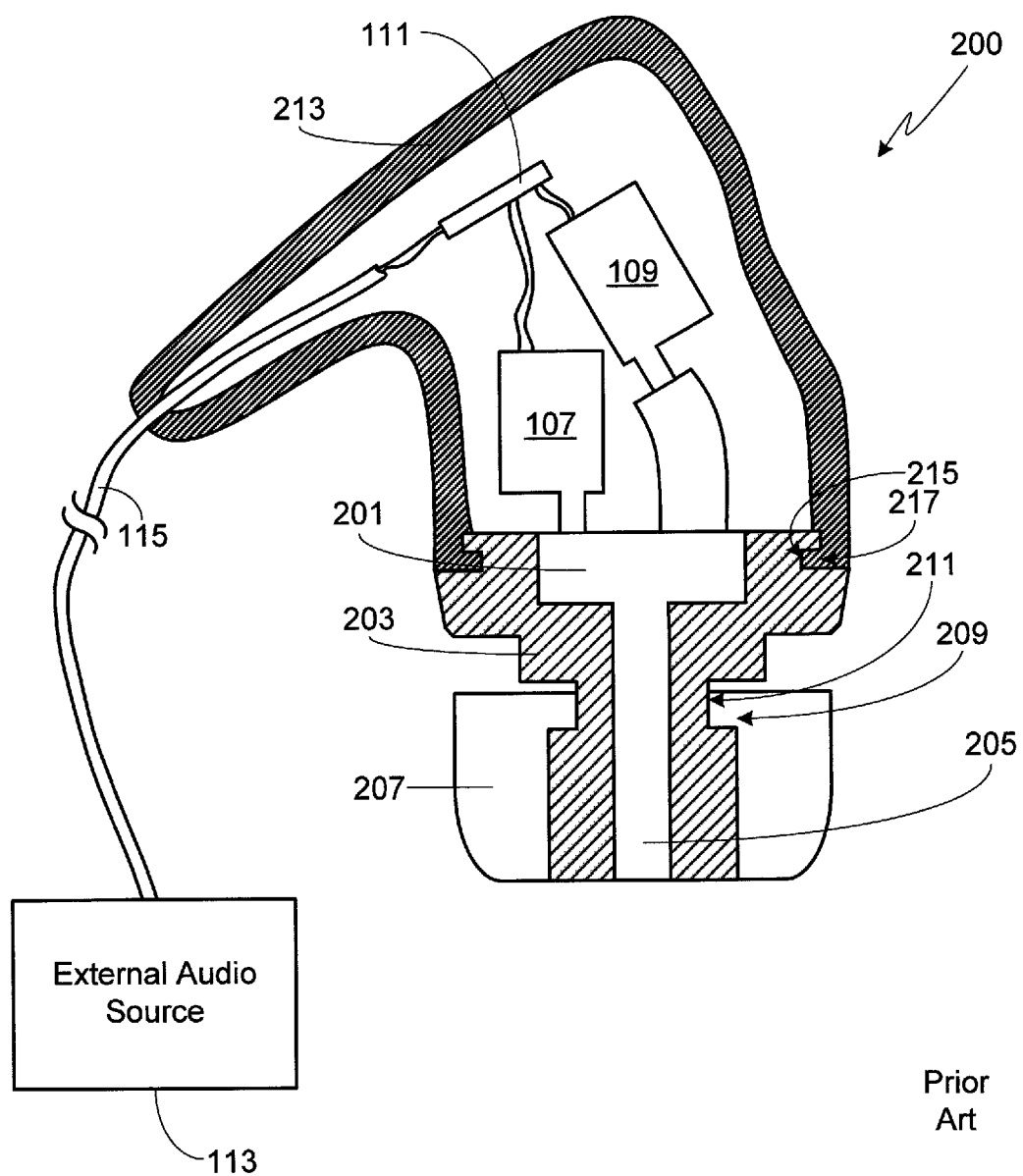
FIG. 2 illustrates the primary elements of a generic in-ear monitor according to the prior art.

While custom fit earpieces are typically more comfortable and provide better sound fidelity than generic earpieces, the latter configuration is traditionally much less expensive to manufacture given the straight-forward fabrication process. FIG. 2 illustrates the primary elements of a generic IEM 200 in accordance with the prior art. As in the prior example, monitor 200 includes a pair of drivers 107/109, a crossover circuit 111, and a cable 115 that couples IEM 200 to external audio source 113. The output from each driver enters an acoustic mixing chamber 201 within sound delivery member 203. A single sound delivery tube 205 delivers the mixed audio from the two drivers through the sound delivery member 203 to the user. Sound delivery member 203 is designed to fit within the outer ear canal of the user and as such, is generally cylindrical in shape.

Attached to the end portion of sound delivery member 203 is an eartip 207, also referred to as an eartip sleeve or simply a sleeve. Sleeve 207 can be fabricated from any of a variety of materials including foam, plastic and silicon-based material. Sleeve 207 can have the generally cylindrical and smooth shape shown in FIG. 2, or can include one or more flanges. To hold sleeve 207 onto member 203 during normal use but still allow the sleeve to be replaced when desired, typically the eartip includes a lip portion 209 which is fit into a corresponding channel or groove 211 in sound delivery member 203. The combination of an interlocking groove 211 with a lip 209 provides a convenient means of replacing sleeve 207, allowing sleeves of various sizes, colors, materials, material characteristics (density, compressibility), or shape to be easily attached to in-ear monitor 200. As a result, it is easy to provide the end user with a comfortable fit at a fraction of the cost of a custom fit earpiece. Additionally, the use of interlocking members 209 and 211 allow worn out eartips to be quickly and easily replaced. It will be appreciated that other eartip mounting methods can be used with earpiece 200. For example, sleeve 207 can be attached to sound delivery member 203 using pressure fittings, bonding, etc.

An outer earpiece enclosure 213 attaches to sound delivery member 203. Earpiece enclosure 213 protects drivers 107/109 and any required earpiece circuitry (e.g., crossover circuit 111) from damage while providing a convenient means of securing cable 115 to the in-ear monitor. Enclosure 213 can be attached to member 203 using interlocking members (e.g., groove 215, lip 217). Alternately, an adhesive or other means can be used to attach enclosure 213 to member 203. Enclosure 213 can be fabricated from any of a variety of materials, thus allowing the designer and/or user to select the material's firmness (i.e., hard to soft), texture, color, etc. Enclosure 213 can either be custom molded or designed with a generic shape.

Figure 3:
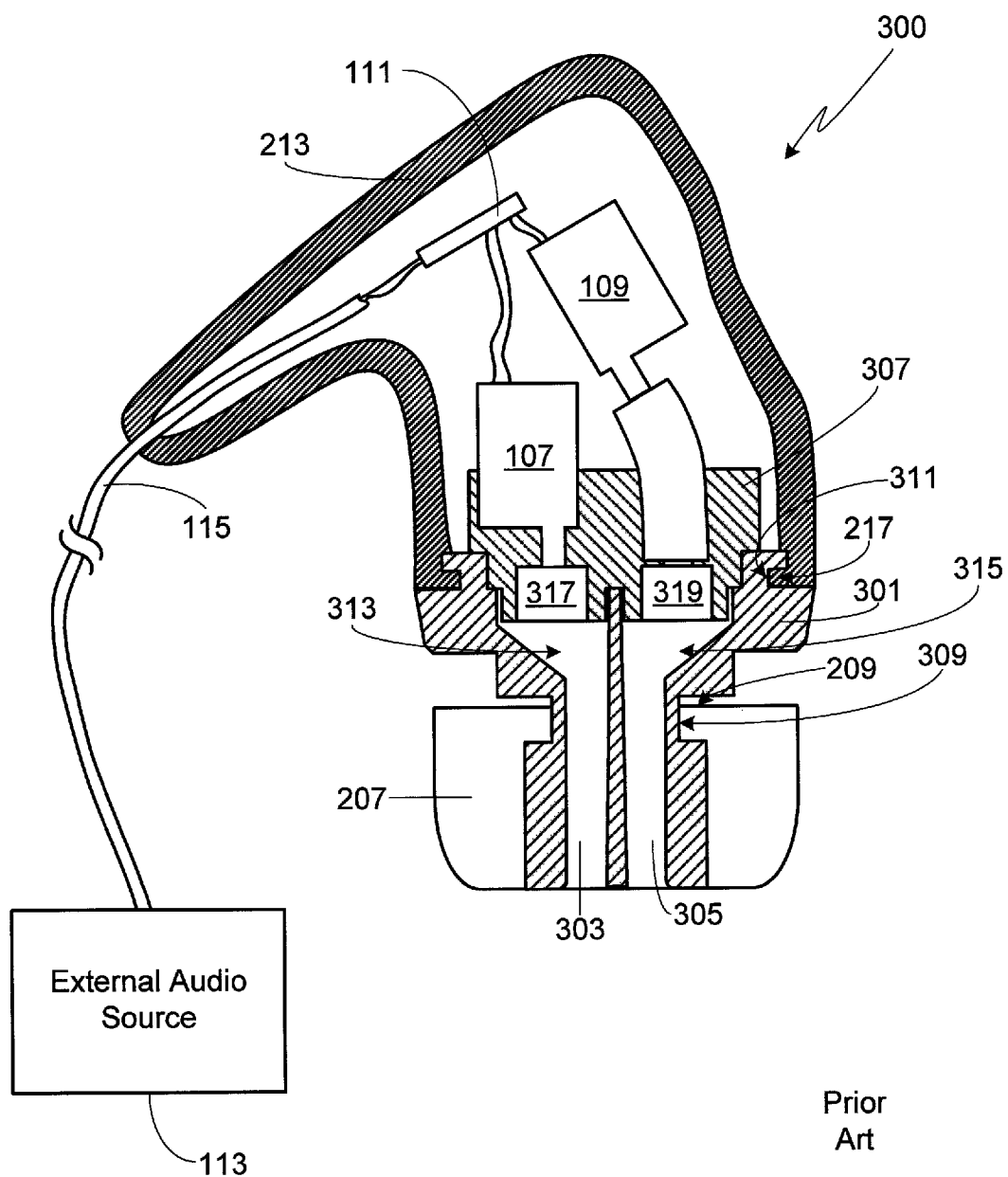
FIG. 3 illustrates the primary elements of a dual bore in-ear monitor according to the prior art.

FIG. 3 illustrates the primary elements of a dual bore in-ear monitor 300 in accordance with the prior art. As shown, in addition to the previously described components, sound delivery member 301 of earpiece 300 includes two separate sound delivery bores 303/305, corresponding to drivers 107 and 109, respectively. Preferably sound delivery member 301 is molded, thus permitting sound delivery bores 303/305 to be easily fabricated within the member. Also preferably a boot member 307 attaches to sound delivery member 301, boot member 307 securing the components to the sound delivery member while still providing a means of including acoustic filters as described more fully below. As with the in-ear monitor illustrated in FIG. 2, monitor 300 includes a removable sleeve 207 (e.g., foam sleeve, silicon sleeve, flanged sleeve, etc.) which is attached by interlocking sleeve lip 209 onto groove 309 of member 301. Similarly, monitor 300 includes a housing enclosure 213 coupled to member 301 using interlocking members (e.g., groove 311, lip 217)

In the in-ear monitor illustrated in FIG. 3, sound delivery tubes 303/305 include transition regions 313/315, respectively. Regions 313/315 redirect the sound emitted by the drivers to the two delivery tubes 303/305, thus insuring that the tubes pass through the small ID of member 301, in particular the necked down region of member 301 corresponding to groove 309. Also shown is an acoustic damper 317 interposed between driver 107 and sound tube 303, and a second acoustic damper 319 interposed between driver 109 and sound tube 305. The use of dampers allows the output from the in-ear monitor 300 in general, and the output from either driver in particular, to be tailored. Tailoring may be used, for example, to reduce the sound pressure level overall or to reduce the levels for a particular frequency range or from a particular driver.

As previously noted, custom fit earpieces typically provide improved performance in terms of delivered sound fidelity and user comfort, while generic earpieces provide a simple, easy to manufacture design that reduces manufacturing time and cost. In accordance with the present invention, and as illustrated in FIGS. 4-6, a single piece driver module 400 is used to achieve the fabrication benefits of a generic earpiece along with the fit and performance benefits associated with a custom fit earpiece.

Figure 4:
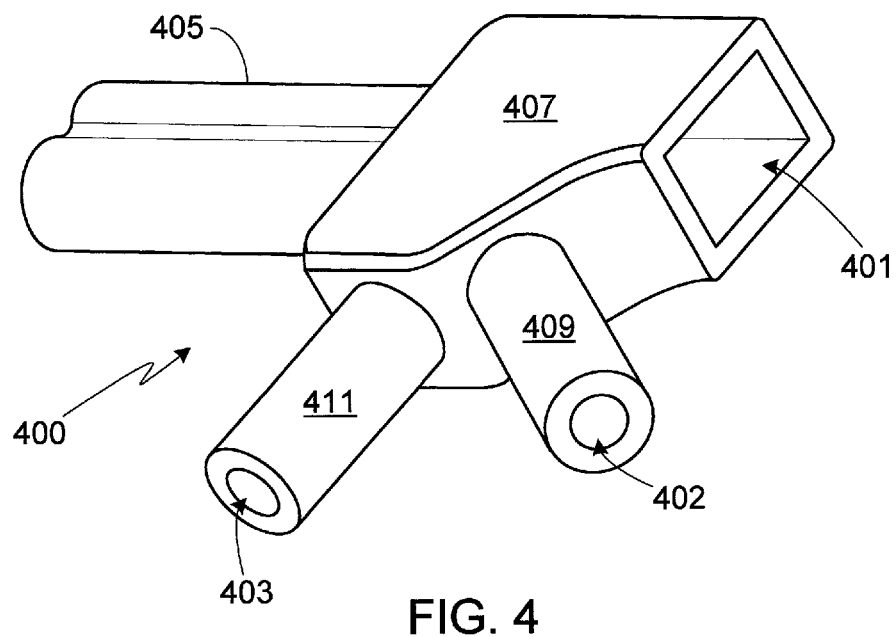
FIG. 4 provides a perspective view of a driver module in accordance with the invention.
Figure 5:
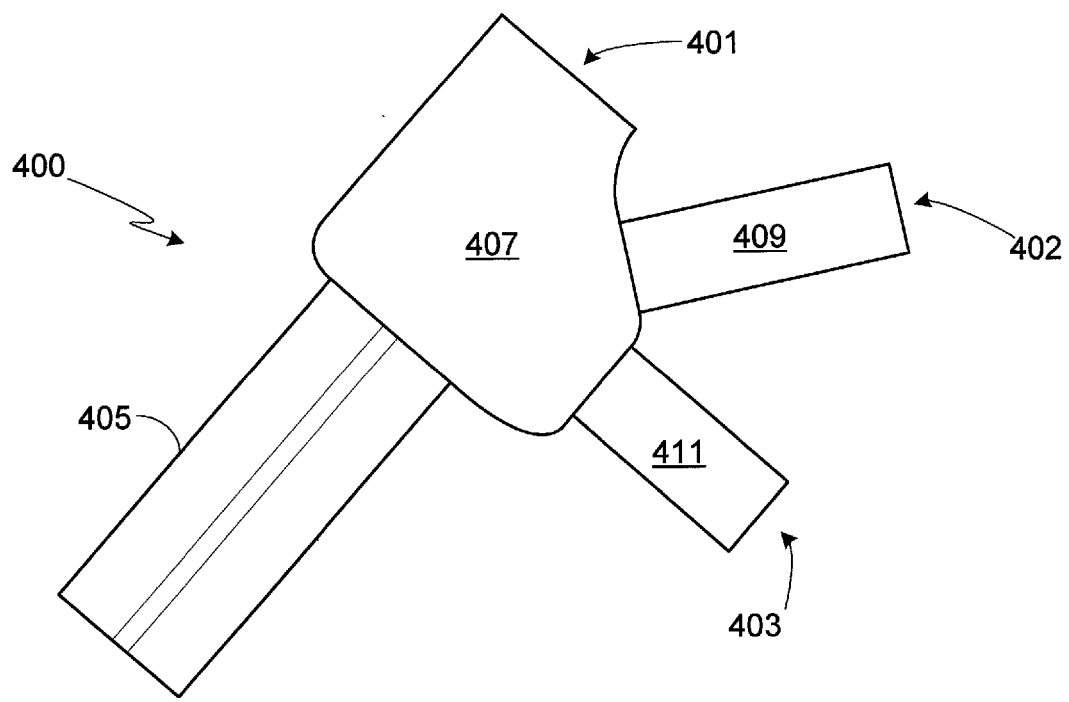
FIG. 5 provides a top view of the driver module shown in FIG. 4.
Figure 6:
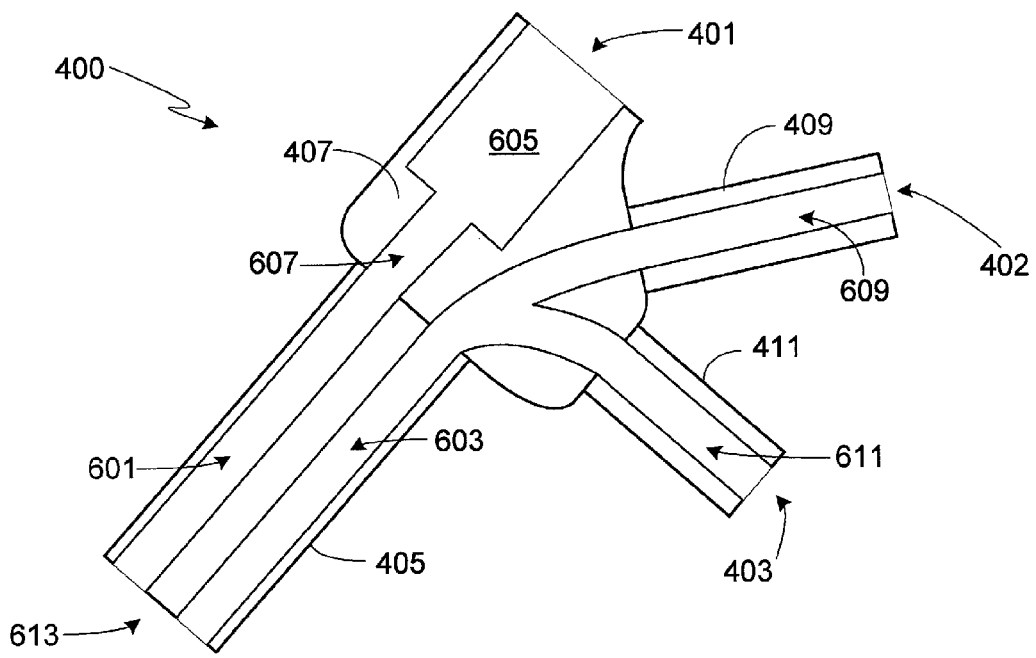
FIG. 6 provides a cross-sectional top view of the driver module shown in FIGS. 4 and 5.

FIG. 4 provides a perspective view of driver module 400, FIG. 5 provides a top view of module 400, and FIG. 6 provides a cross-sectional top view of module 400. Driver module 400 includes a plurality of driver ports. In the preferred embodiment module 400 includes three driver ports 401-403, although it will be appreciated that the driver module may include additional driver ports or as few as two driver ports. As described in further detail below, the driver ports are acoustically coupled to one or more sound bores contained within the driver module's acoustic output member 405. Member 405 extends away from one side of the body 407 of driver module 400. Preferably sound output member 405 includes a pair of sound bores 601 and 603 as shown, although the driver module may be configured to use a single sound bore or more than two sound bores.

In the illustrated and preferred embodiment, driver port 401 is formed as a cavity 605 within body 407 of driver module 400, cavity 601 shaped to accommodate a single driver (not shown in FIG. 6). Cavity 605 opens to an acoustic transition duct 607 that acoustically couples the output of an armature housed within cavity 605 to sound bore 601 in acoustic output member 405. The remaining two driver ports 402 and 403 are formed as extended members 409 and 411, respectively, of body 407 of module 400. Preferably driver port members 409 and 411 are formed as cylinders. Sound bore 609 of member 409 passes through body 407 after which it transitions into sound bore 603 of output member 405. Sound bore 611 of member 411 merges with sound bore 609 within module body 407 before transitioning into sound bore 603 of output member 405.

Driver module 400 is pre-tuned, thus allowing it to be easily incorporated into a custom-fit ear mold without the need for post-assembly tuning as required by the prior art manufacturing process. In general, pre-tuning of the driver module is accomplished by pre-selecting the lengths, as well as bore diameters, for extended driver port members 409/411, transition duct 607, and acoustic output member 405. In some embodiments, additional IEM tuning is achieved by adjusting the output of individual gain amplifiers associated with the drivers. Additionally, acoustic filters (i.e., dampers) may be inserted within driver module 400, for example between one or more of the drivers and their respective driver ports.

Figure 7:
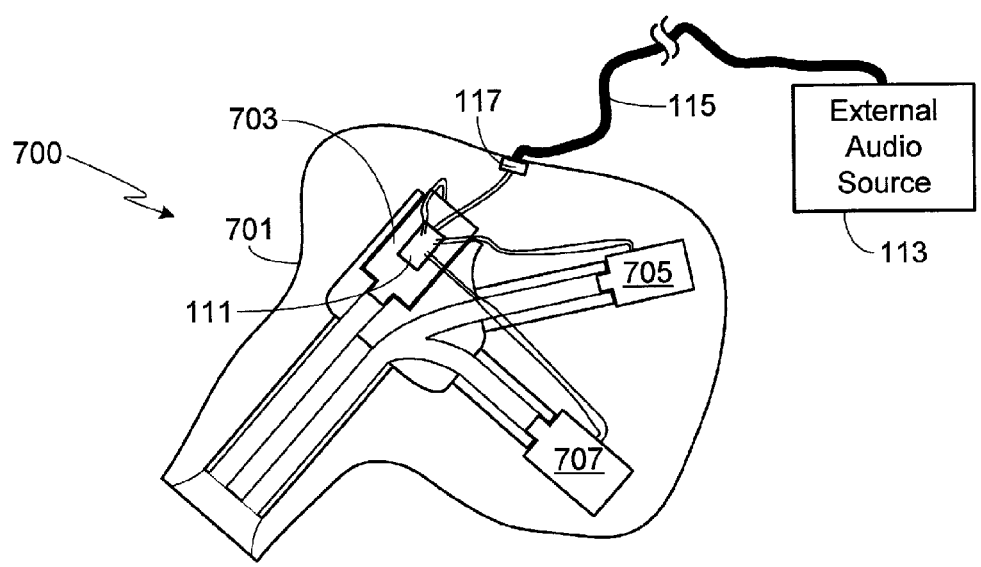
FIG. 7 illustrates the driver module of the invention integrated into a custom-fit ear mold, this view providing an internal top view of the IEM in order to clearly show the relative positions of the drivers relative to the driver ports.

FIG. 7 illustrates driver module 400 integrated into a custom-fit ear mold 701, this view providing an internal top view of IEM 700 in order to clearly show the relative positions of the drivers relative to the driver ports 401-403. Preferably driver 703, which is housed within cavity 605, is a high-frequency driver, thereby taking advantage of the short and relatively straight acoustic pathway between the driver output and the output face 613 of acoustic output member 405. Preferably drivers 705 and 707 are mid- and low-frequency drivers, respectively. Crossover circuit 111, either a passive crossover circuit or an active crossover circuit, is coupled to external audio source 113 and provides input to drivers 703, 705 and 707. As in the prior art IEMs, cable 115 may either be hard-wired to IEM 700 or electrically connected to IEM 700 via a cable socket 117 integrated into the IEM as shown.

Figure 8:
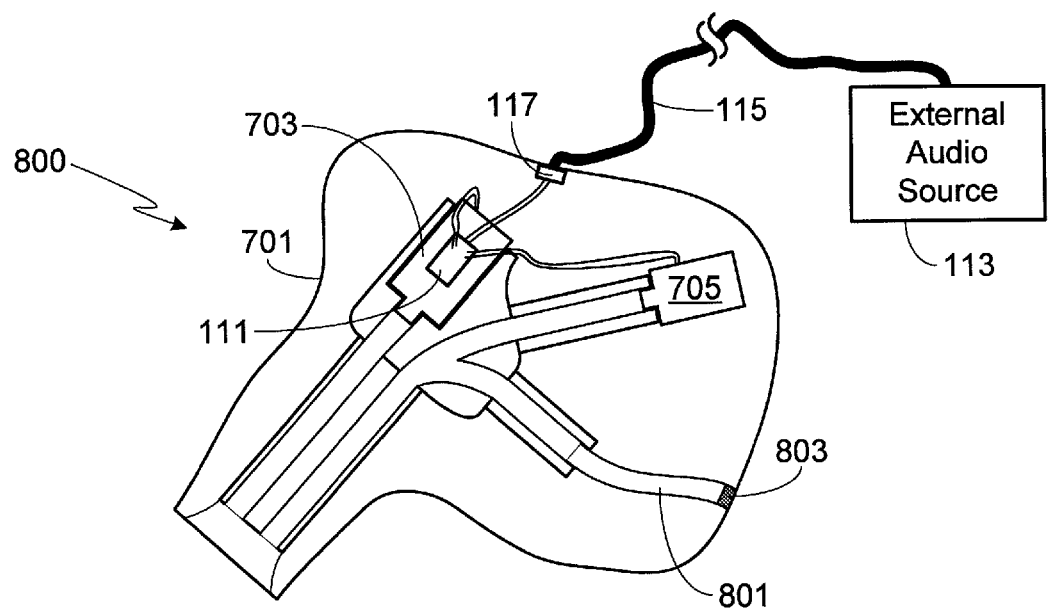
FIG. 8 provides a similar view of an IEM to that shown in FIG. 7, except that one of the drivers has been replaced by an ambient sound bore.

In addition to simplifying IEM fabrication, the single piece driver module of the present invention also provides a single component that can be used in a variety of IEM configurations by simply varying the number and type of drivers coupled to the driver ports. For example, in the configuration illustrated in FIG. 8, rather than coupling a driver to driver port 411, this port is coupled via sound bore 801 to the ambient environment. As a result, ambient noises pass through bores 801, 611 and 603 and then directly into the user's ear canal via acoustic output member 405. Although not required, in this embodiment a damper 803 is inserted into the bore to attenuate ambient sound levels to the desired level. Note that FIG. 8 provides a similar view of an IEM to that shown in FIG. 7, except that driver 707 has been replaced by ambient sound bore 801.

In the configuration described above in which single piece driver module 400 is separate from the custom-fit ear mold, preferably one or more of the various members that extend away from body 407, e.g., output member 405 and driver port members 409 and 411, are fabricated from a pliable material so that they may be moved out of plane as required by the specific geometry of each particular user's ear mold. The body 407 of the module may be fabricated from the same pliable material or from a rigid material such as a plastic. Preferably the pliable portions of module 400 are fabricated from silicone, although other elastomeric materials that allow out-of-plane positioning of members 405, 409 and 411 may be used (e.g., neoprene, ethylene propylene diene monomer (EPDM), nitrile rubber, nitrile, polyvinyl chloride (PVC), nitrile/PVC blends, urethane, etc.).

Figure 9:
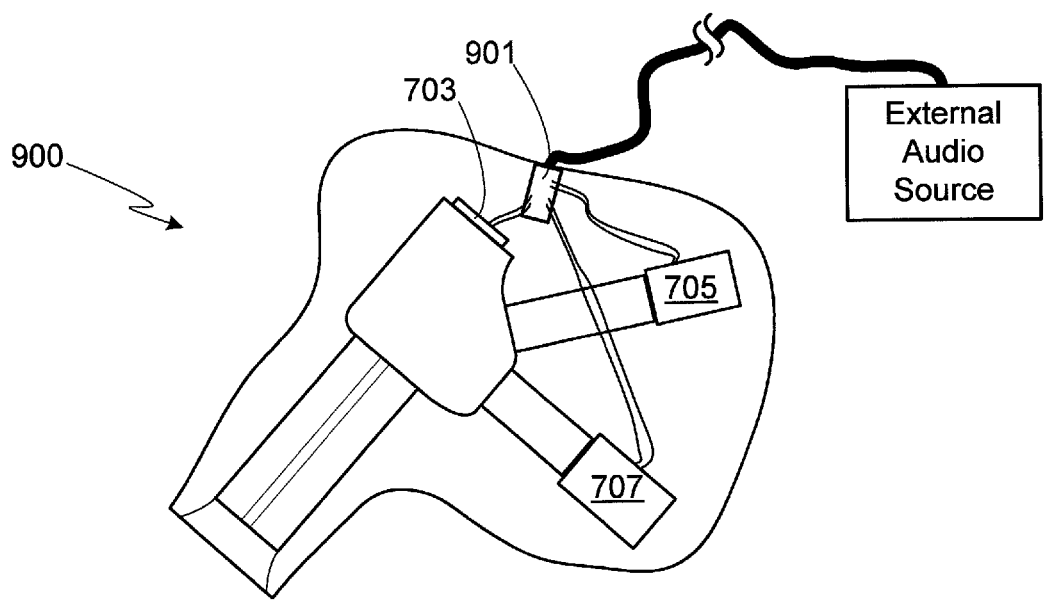
FIG. 9 illustrates an embodiment in which the cable socket and the crossover circuit are integrated into a single component.
Figure 10:
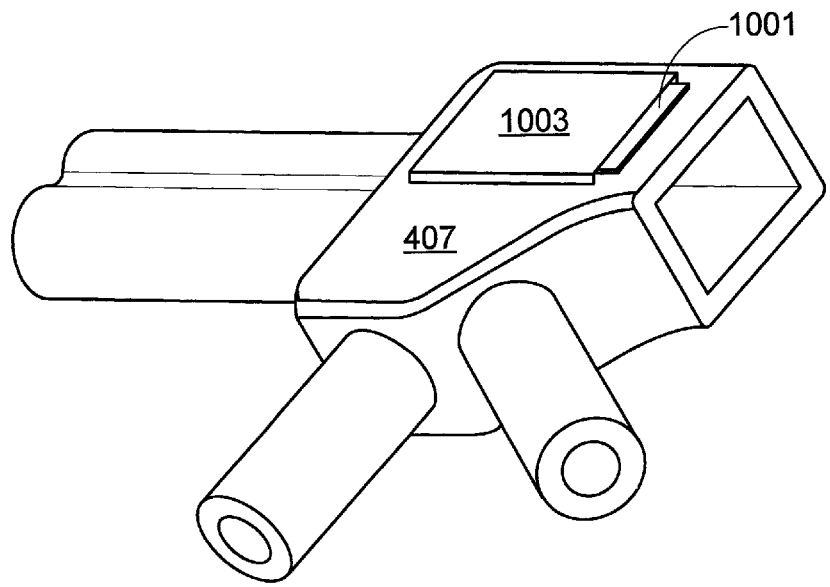
FIG. 10 illustrates the use of a slotted cavity formed on one surface of the driver module that is used to hold the crossover circuit board in place during assembly.
Figure 11:
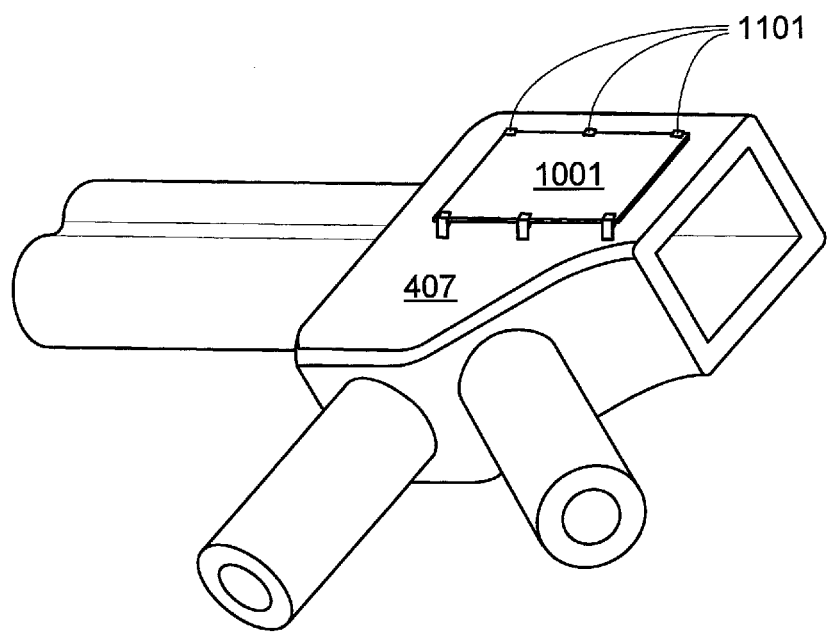
FIG. 11 illustrates a plurality of mounting clips which hold the crossover circuit board in place during assembly.
Figure 12:
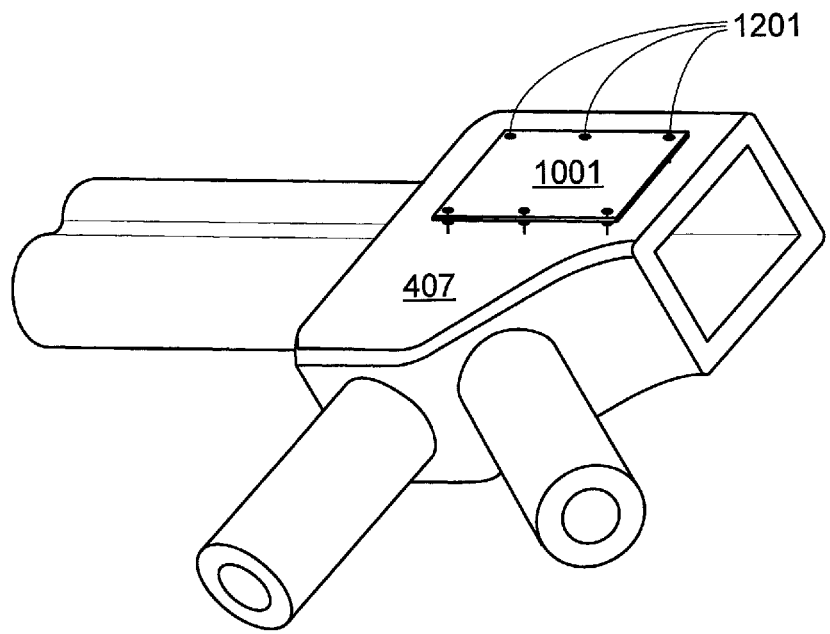
FIG. 12 illustrates a plurality of barbed stand-offs which hold the crossover circuit board in place during assembly.

The IEM's crossover circuit, which provides a means of dividing the input electrical signal among the plurality of IEM drivers (e.g., drivers 703, 705 and 707), may be integrated into the IEM in a variety of ways without affecting the invention. For example, in IEM 900 shown in FIG. 9, the cable socket and the crossover circuit are combined into a single component 901, thereby further simplifying IEM fabrication. Alternately, the crossover circuit may be fabricated on a separate printed circuit board (PCB) 1001 that is installed within the IEM during assembly. Although not required, in such a configuration preferably driver module 400 includes mounting means for circuit board 1001, thus simplifying IEM fabrication. It should be understood that there are a variety of techniques that may be used to capture circuit board 1001 and that the invention is not limited to a specific mounting means, nor does the invention even require the use of mounting means. FIGS. 10-12 illustrate exemplary circuit mounting means. In the embodiment shown in FIG. 10, a slotted cavity 1003 is formed on one surface of body 407 of the driver module. During IEM fabrication circuit 1001 is slipped into the cavity as shown. In the embodiment shown in FIG. 11, a plurality of mounting clips 1101 hold circuit board 1001 in place. In the embodiment shown in FIG. 12, a plurality of barbed stand-offs 1201 are inserted through corresponding mounting holes within circuit board 1001. In an alternate embodiment, circuit board 1001 is simply bonded to a surface of driver module 400.

Figure 13:
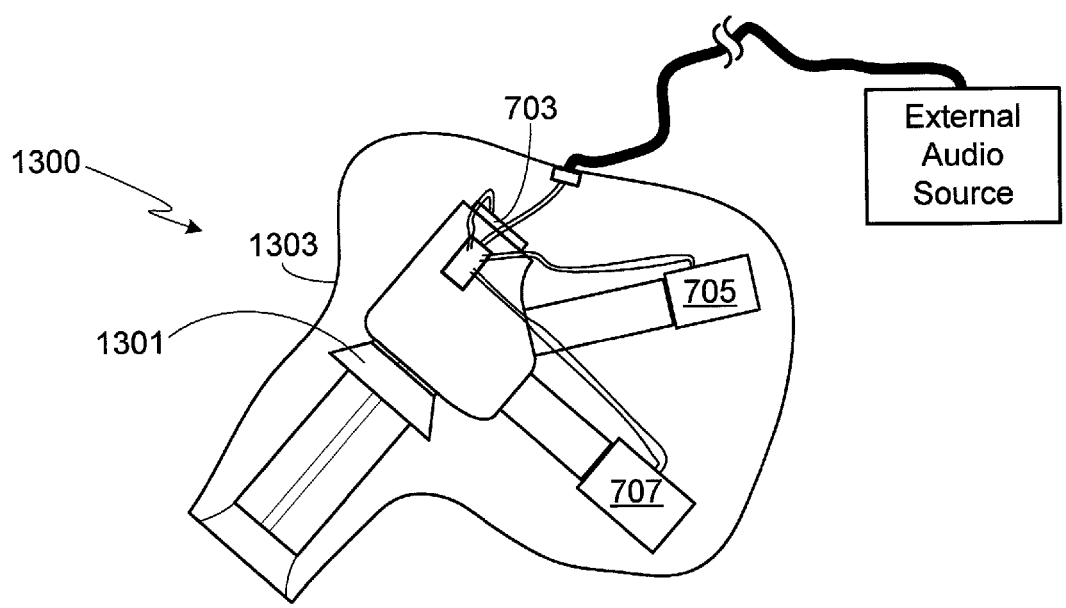
FIG. 13 illustrates the use of a locking feature, in particular a locking barb located on the acoustic output member, that insures that the driver module is properly positioned and held in place within the IEM custom-fit ear mold.
Figure 14:
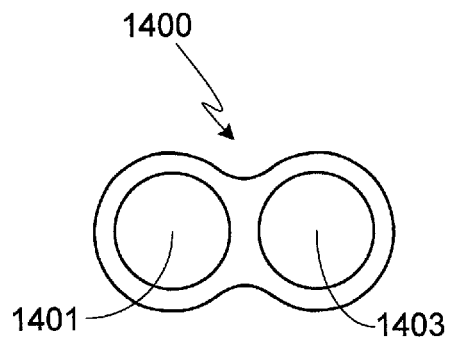
FIG. 14 provides a cross-sectional view of an acoustic output member in accordance with a first embodiment.
Figure 15:
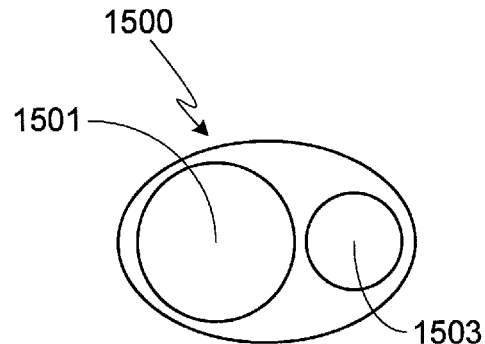
FIG. 15 provides a cross-sectional view of an acoustic output member in accordance with a second embodiment.
Figure 16:
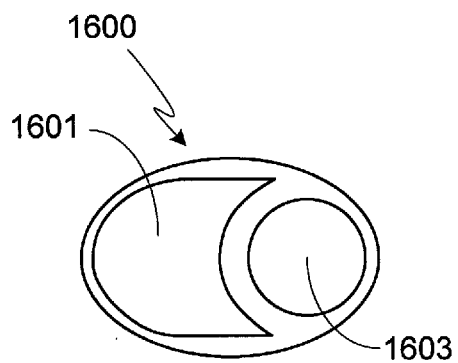
FIG. 16 provides a cross-sectional view of an acoustic output member in accordance with a third embodiment.
Figure 17:
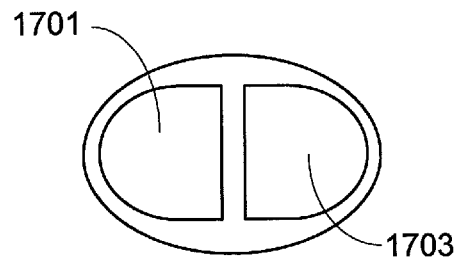
FIG. 17 provides a cross-sectional view of an acoustic output member in accordance with a fourth embodiment.
Figure 18:
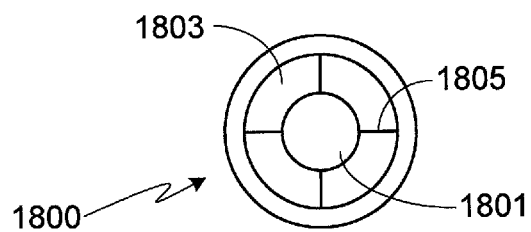
FIG. 18 provides a cross-sectional view of an acoustic output member in accordance with a fifth embodiment.

In some embodiments of the invention, driver module 400 includes one or more external features that aid in positioning and/or maintaining the module within the custom-fit ear mold. For example, IEM 1300 shown in FIG. 13 includes a locking barb 1301 located on acoustic output member 405 that insures that the driver module is properly positioned and held in place within IEM custom-fit ear mold 1303.

As previously noted, sound output member 405 preferably includes a pair of sound bores although it may be configured to use a single sound bore or more than two sound bores. Additionally, and as described below, the present invention is not limited to a specific cross-sectional shape for either the acoustic output member or the sound bores contained therein. FIGS. 14-18 illustrate exemplary cross-sections for an acoustic output member with dual sound bores. In the embodiment shown in FIG. 14, acoustic output member 1400 includes a pair of side-by-side sound bores 1401 and 1403, where the two sound bores have equivalent cross-sections. Acoustic output member 1500 shown in the embodiment of FIG. 15 also includes a pair of side-by-side sound bores, but in this embodiment the cross-section of sound bore 1501 is larger than the cross-section of sound bore 1503. Typically in this embodiment the high frequency driver (e.g., driver 703) is acoustically coupled to the larger sound bore (e.g., sound bore 1501) while the mid- and low-frequency drivers (e.g., drivers 705 and 707) are acoustically coupled to the smaller sound bore (e.g., sound bore 1503). In the embodiment illustrated in FIG. 16, sound bore 1601 has a non-circular cross-section while the second, smaller sound bore 1603 has a circular cross-section. In the embodiment illustrated in FIG. 17, both sound bore 1701 and sound bore 1703 utilize non-circular cross-sections. The embodiment of FIG. 18 uses a pair of concentric sound bores 1801 and 1803 with the inner bore 1801 being held in place and apart from the outer bore 1803 by a plurality of support struts 1805.

Figure 19:
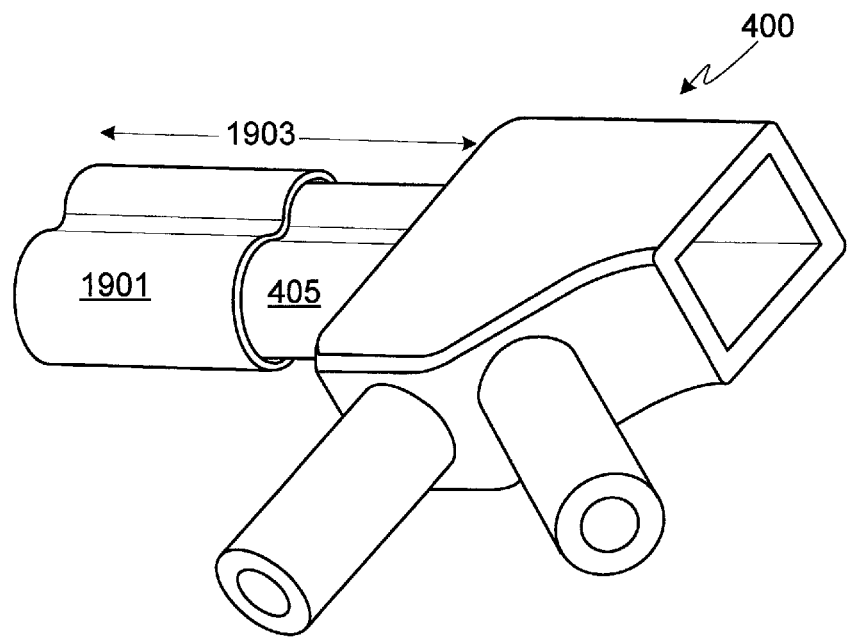
FIG. 19 illustrates the driver module of the invention with a sliding extension on the acoustic output member.
Figure 20:
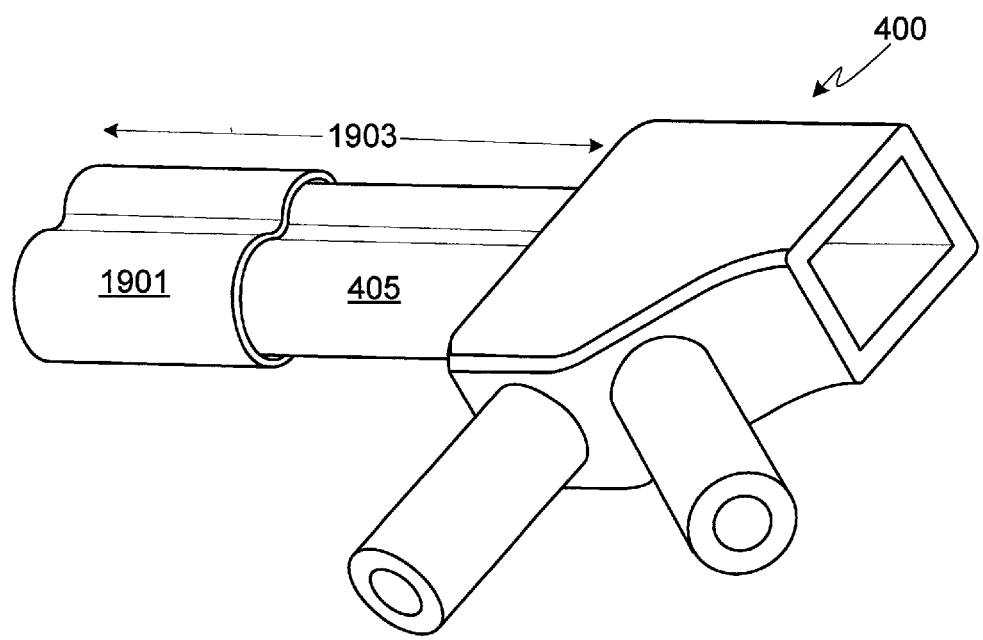
FIG. 20 illustrates the driver module shown in FIG. 19 with the acoustic output member sliding extension extended.

In at least one embodiment of the invention, driver module 400 includes an extension 1901 fitted onto the acoustic output member 405. FIG. 19 shows extension 1901 in a non-extended position while FIG. 20 shows extension 1901 in an extended position. Extension 1901 allows the length 1903 of the acoustic output member to be varied depending upon the desired acoustic performance as well as the size and shape of the custom-fit ear mold into which the driver module is to be fit.

One of the benefits of the present invention is that it allows a pre-tuned driver assembly which utilizes the acoustically optimized driver module described above to be inserted into a custom-fit IEM shell, thereby greatly simplifying custom-fit IEM fabrication and assembly. While the driver assembly and the crossover circuit may be sealed within the IEM shell using a filler, an alternative approach is to use a faceplate to seal the IEM shell after the components have been inserted. In this approach, the IEM components may be held in place by an adhesive, padding, filler or an interference fit with the internal features of the IEM shell. By using the same size cutout for each custom IEM shell, the same faceplate can be used, thereby further reducing IEM fabrication complexity.

Figure 21:
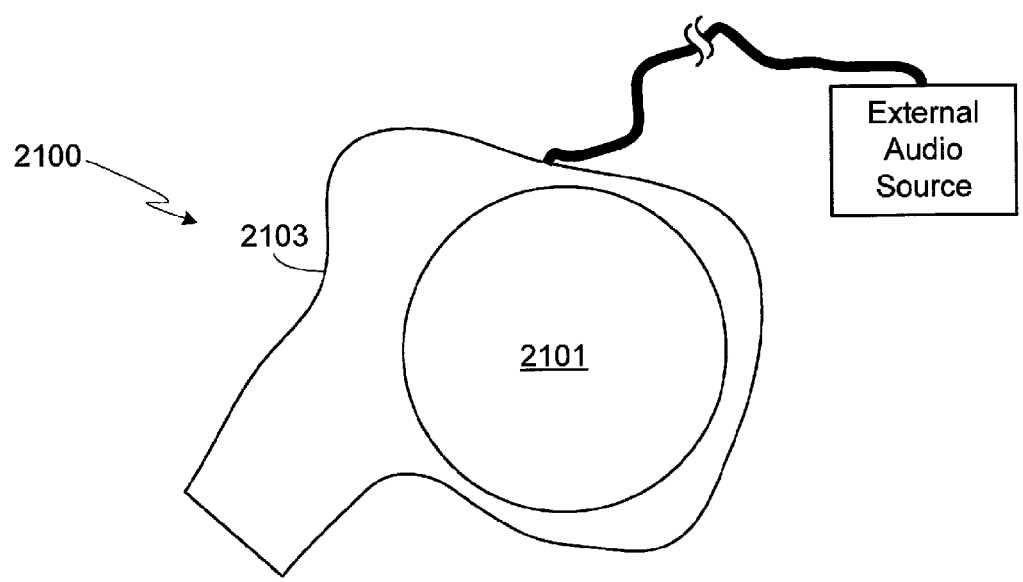
FIG. 21 provides a top view of an IEM with a faceplate in accordance with the invention.
Figure 22:
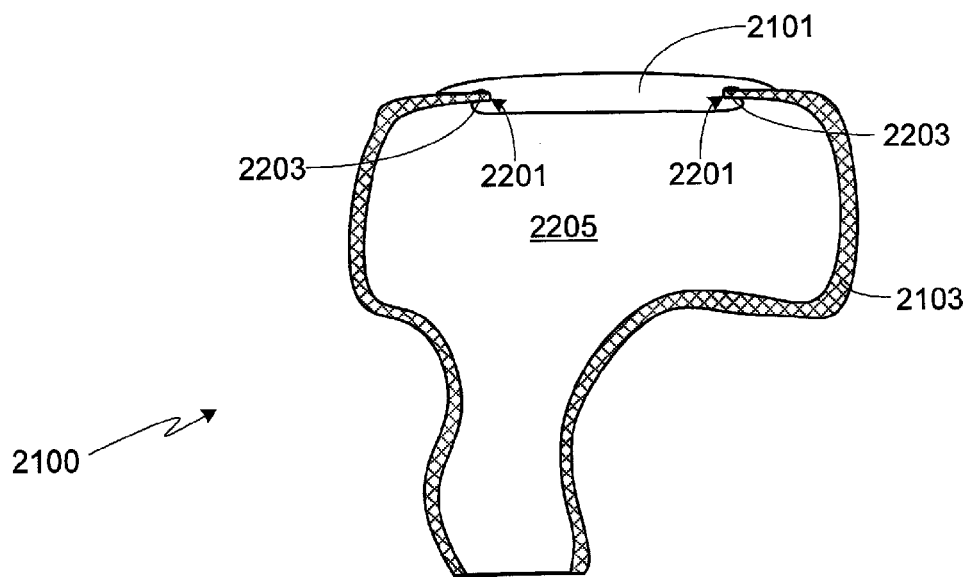
FIG. 22 provides a cross-sectional view of the IEM and faceplate assembly shown in FIG. 21.

FIGS. 21 and 22 illustrate a preferred design for an IEM faceplate in accordance with the invention. Faceplate 2101, which can be fabricated from plastic or any sufficiently rigid material, fits within a suitably sized opening within IEM shell 2103 of IEM 2100. Although the opening within the IEM shell may have a distinct shape, preferably it is circularly-shaped, thus allowing the faceplate to be easily installed. Rather than being bonded to the IEM shell, preferably faceplate 2101 is designed to snap-fit within the IEM opening, thus allowing subsequent faceplate removal if the IEM must be repaired or otherwise altered. In order to achieve the preferred snap-fit, the lip 2201 of the IEM shell opening fits within a corresponding groove within faceplate 2101 as shown in the cross-sectional view of FIG. 22. Preferably an O-ring 2203 seals faceplate 2101 into IEM shell 2103. For clarity, the IEM components, e.g., driver module, drivers, crossover circuit, etc., are not shown in the open center section 2205 of the cross-sectional view of FIG. 22.

Figure 23:
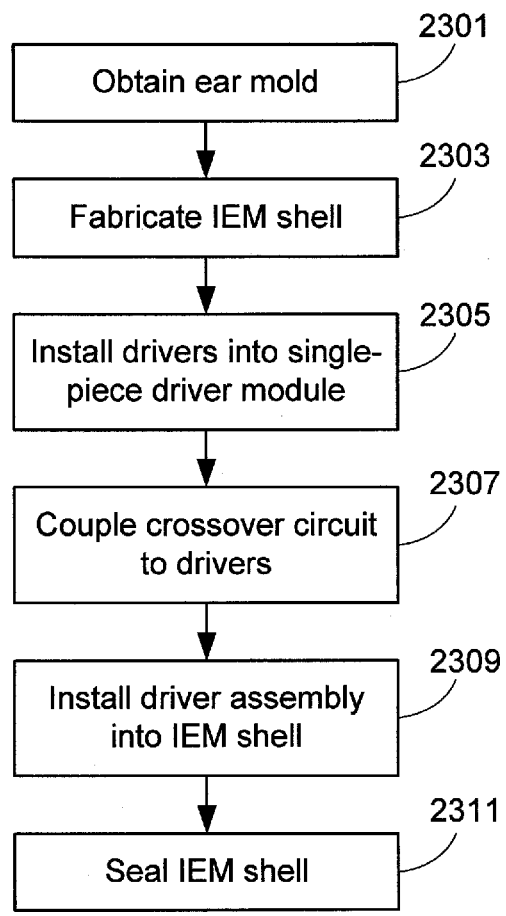
FIG. 23 illustrates a fabrication and assembly process suitable for use with the driver module of the invention.

As noted above, the use of a pre-tuned, single piece driver module simplifies the fabrication of a custom-fit IEM, thereby reducing cost, while insuring that the performance consistently meets the acoustic goals for the device. FIG. 23 illustrates the primary manufacturing steps associated with the fabrication of a custom-fit IEM utilizing the single piece driver module of the invention. Initially in step 2301 a mold is taken of the end user's ear or, more typically, of both of the end user's ears in order to allow a pair of custom-fit IEMs to be fabricated. Using the mold(s), the custom-fit IEM shell(s) is fabricated (step 2303). Then, after installing the drivers into the driver module (step 2305) and coupling the crossover circuit to the drivers (step 2307), the single piece driver module, drivers, and crossover circuit are inserted into the custom-fit IEM shell(s) (step 2309). Lastly, the IEM shell is sealed (step 2311) in order to protect the internal components. The step of sealing the IEM shell may use a filler (e.g., an epoxy or polyester resin) that is added to the cavity within the IEM shell(s), the filler capturing and protecting the driver module, drivers, crossover circuit and wiring within the shell(s). Step 2311 may also utilize the IEM cover described above and shown in FIGS. 21 and 22. It will be appreciated that due to the use of the pre-tuned driver module, the IEM(s) does not have to be tuned prior to finalization.

Figure 24:
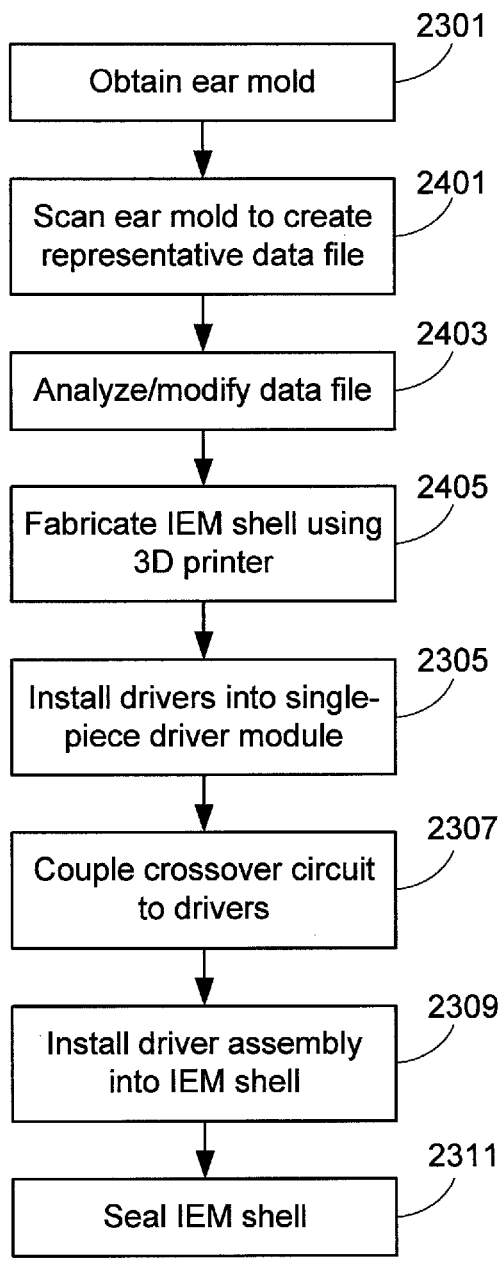
FIG. 24 illustrates an alternate fabrication and assembly process suitable for use with the driver module of the invention.

By eliminating the necessity of tuning each IEM prior to finalization, the present invention allows the manufacturing process to be substantially altered from the traditional, more labor intensive process typically used to manufacture custom-fit IEMs. For example, FIG. 24 illustrates a modified assembly process based on the procedure outlined in FIG. 23. In the modified process after the end user's ear mold is taken (step 2301), the ear mold is scanned (step 2401), for example using a three-dimensional (3D) scanner, in order to create a data file that represents the shape of the desired ear mold (step 2401). The data file is then analyzed and modified to create a final data file that represents the desired external shape as well as the desired internal features that will allow the ear mold to accommodate the single piece driver module 400 and driver assembly. (Step 2403). Using the final data file, a 3D printer is then used to fabricate the IEM shell (step 2405). Once the IEM shell is fabricated and the drivers and crossover circuit have been installed onto the driver module (steps 2305 and 2307), the single piece driver module, drivers, and crossover circuit are inserted into the IEM shell (step 2309) and the IEM shell is sealed in order to protect the IEM internal assembly (step 2311).

Figure 25:
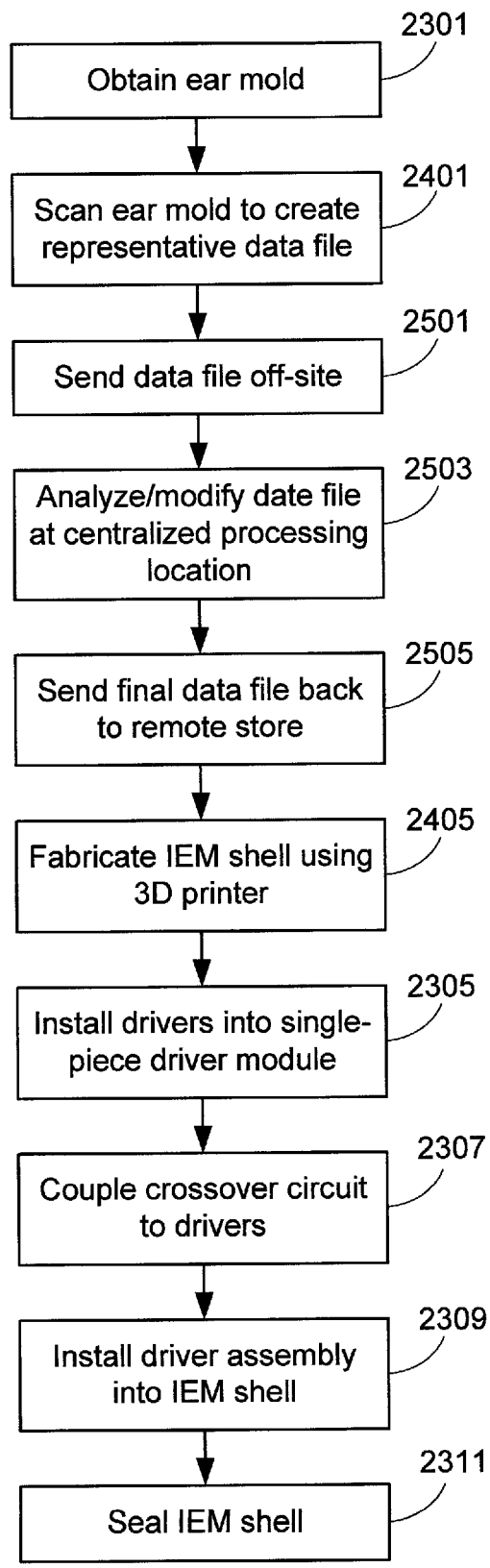
FIG. 25 illustrates an alternate fabrication and assembly process suitable for use with the driver module of the invention.

As a result of simplifying the manufacturing and assembly process, the present invention allows portions of the process to be performed remotely and off-site. For example and as illustrated in FIG. 25, the ear mold may be made (step 2301) and scanned (step 2401) at a location convenient for the end user, for example a store within a shopping mall, a stand-alone store, or a region carved out of an existing store (e.g., a store-within-a-store). The data file created at the store can then be sent to another site, for example a central processing site in a different geographic region, for analysis (step 2501). At the central processing site the initial data file is analyzed and modified to include the desired internal features that will allow the ear mold to accommodate the single piece driver module 400 and driver assembly (step 2503). The final data file along with assembly instructions are then sent back to the remotely located store (step 2505) where the IEM shell is fabricated, for example using a 3D printer (step 2405). The driver assembly, i.e., single piece driver module, drivers and crossover circuit, is then assembled (steps 2305 and 2307) and inserted into the IEM shell (step 2309) after which the IEM shell is sealed (step 2311).

In the process described above, the use of a single piece, pre-tuned driver module not only simplifies IEM construction, but it also allows relatively un-trained personnel to assemble the final IEM. To further simplify the process entire driver assemblies, i.e., single piece driver module, drivers and crossover circuit, may be pre-assembled, thereby further minimizing the tasks that must be performed on-site (e.g., within the store).

Figure 26:
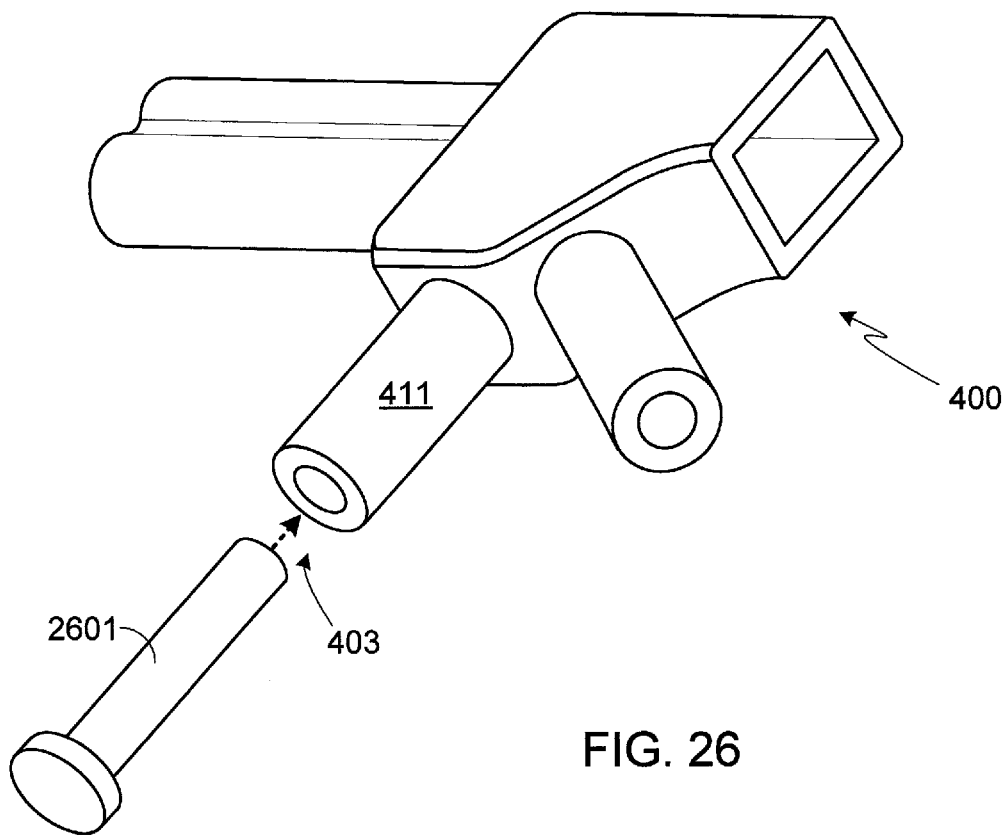
FIG. 26 illustrates a driver port plug prior to assembly.
Figure 27:
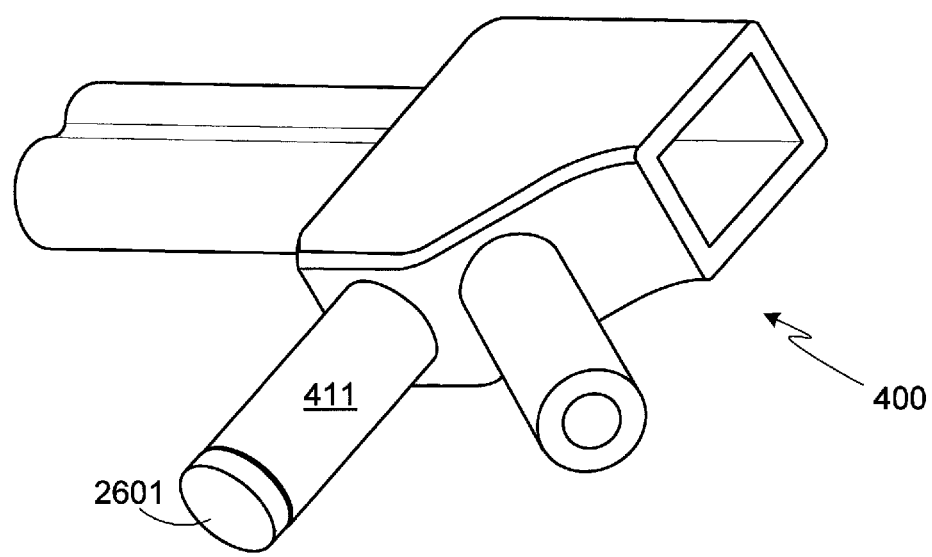
FIG. 27 illustrates the driver port plug shown in FIG. 26 post-assembly.
Figure 28:
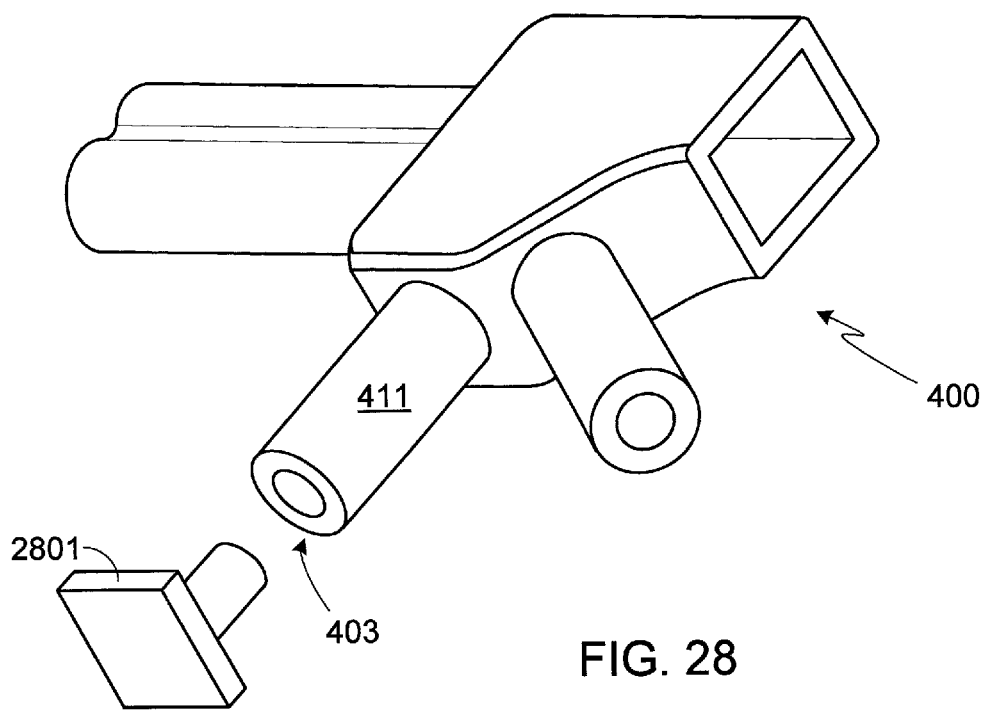
FIG. 28 illustrates an alternate driver port plug prior to assembly.
Figure 29:
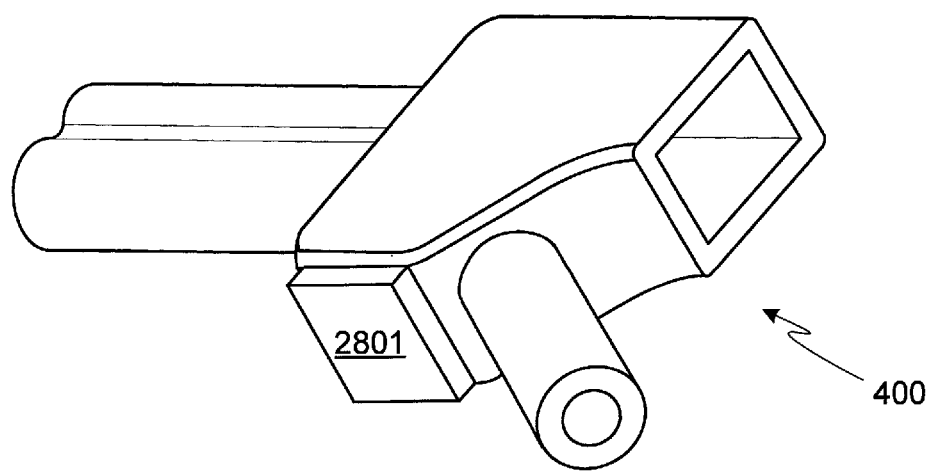
FIG. 29 illustrates the driver port plug shown in FIG. 28 post-assembly.

In order to further expand the usefulness of the single piece driver module of the invention, it is possible to block off one or more of the driver ports during assembly. As a result, the same single piece driver module can be modified to use a fewer number of drivers, thereby lowering IEM cost. FIGS. 26 and 27 illustrate the use of a simple plug 2601 which, in this example, is inserted into driver port 403. FIGS. 28 and 29 illustrate a different type of plug, also shown inserted into driver port 403, which requires that driver port member 411 be removed (e.g., cut-off) prior to insertion of plug 2801.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A custom-fit in-ear-monitor (IEM), comprising:
a custom-fit ear mold shell;
a single piece driver module configurable to fit within said custom-fit ear mold shell, said single piece driver module comprising:
   a plurality of driver ports, wherein at least one of said plurality of driver ports is comprised of a first hollow member that extends away from a body portion of said single piece driver module; and
   an acoustic output member, wherein said acoustic output member extends away from said body portion of said single piece driver module, wherein said acoustic output member includes at least one sound bore that is acoustically coupled to an acoustic output surface of said custom-fit ear mold shell, and wherein said at least one sound bore is acoustically coupled via a plurality of sound ducts within said single piece driver module to said plurality of driver ports; and
a plurality of drivers disposed within said custom-fit ear mold shell, wherein one of each of said plurality of drivers is coupled to a corresponding one of each of said plurality of driver ports;
a crossover circuit disposed within said custom-fit ear mold shell and electrically coupled to said plurality of drivers, wherein said crossover circuit is configured to receive an electrical signal from an audio source that is external to said custom-fit IEM and to provide separate input signals to each of said plurality of drivers based on said electrical signal; and
a filler disposed within said custom-fit ear mold shell, wherein said filler is disposed within said custom-fit ear mold shell after said single piece driver module and said plurality of drivers and said crossover circuit have been installed within said custom-fit ear mold shell, and wherein said filler captures and holds said single piece driver module and said plurality of drivers and said crossover circuit within said custom-fit ear mold shell.

2. A custom-fit in-ear-monitor (IEM), comprising;
a custom-fit ear mold shell;
a single piece driver module configurable to fit within said custom-fit ear mold shell, said single piece driver module comprising:
   a plurality of driver ports, wherein at least one of said plurality of driver ports is comprised of a first hollow member that extends away from a body portion of said single piece driver module; and
   an acoustic output member, wherein said acoustic output member extends away from said body portion of said single piece driver module, wherein said acoustic output member includes at least one sound bore that is acoustically coupled to an acoustic output surface of said custom-fit ear mold shell, and wherein said at least one sound bore is acoustically coupled via a plurality of sound ducts within said single piece driver module to said plurality of driver ports; and
a plurality of drivers disposed within said custom-fit ear mold shell, wherein one of each of said plurality of drivers is coupled to a corresponding one of each of said plurality of driver ports;
a crossover circuit disposed within said custom-fit ear mold shell and electrically coupled to said plurality of drivers, wherein said crossover circuit is configured to receive an electrical signal from an audio source that is external to said custom-fit IEM and to provide separate input signals to each of said plurality of drivers based on said electrical signal; and a faceplate configured to close an opening in said custom-fit ear mold shell, wherein said single piece driver module and said plurality of drivers are inserted through said opening in said custom-fit ear mold shell prior to closing said opening with said faceplate.

3. The custom-fit IEM of claim 1, wherein a second driver port of said plurality of driver ports is comprised of a second hollow member that extends away from said body portion of said single piece driver module.

4. The custom-fit IEM of claim 1, wherein at least one of said plurality of driver ports is comprised of a cavity formed within said body portion of said single piece driver module, and wherein at least one of said plurality of drivers is at least partially disposed within said cavity.

5. The custom-fit IEM of claim 1, further comprising a cable socket integrated into said custom-fit ear mold shell, wherein a source input cable coupleable to said audio source is attached to said custom-fit IEM and to said crossover circuit via said cable socket.

6. The custom-fit IEM of claim 5, wherein said crossover circuit is integrated into said cable socket.

7. The custom-fit IEM of claim 1, wherein said body portion of said single piece driver module is fabricated from a rigid material and wherein said first hollow member and said acoustic output member are fabricated from a pliable material.

8. The custom-fit IEM of claim 7, wherein said rigid material is comprised of a plastic material.

9. The custom-fit IEM of claim 7, wherein said pliable material is selected from the group of elastomeric materials consisting of silicone, neoprene, ethylene propylene diene monomer, nitrile rubber, nitrile, polyvinyl chloride, nitrile/PVC blends, and urethane.

10. The custom-fit IEM of claim 1, wherein said single piece driver module including said body portion, said plurality of driver ports and said acoustic output member are fabricated from a pliable material.

11. The custom-fit IEM of claim 10, wherein said pliable material is selected from the group of elastomeric materials consisting of silicone, neoprene, ethylene propylene diene monomer, nitrile rubber, nitrile, polyvinyl chloride, nitrile/PVC blends, and urethane.

12. The custom-fit IEM of claim 1, wherein a second driver port of said plurality of driver ports is comprised of a second hollow member that extends away from said body portion of said single piece driver module and is acoustically coupled to an ambient environment.

13. The custom-fit IEM of claim 1, further comprising a printed circuit board (PCB), wherein said crossover circuit is contained on said PCB.

14. The custom-fit IEM of claim 13, said single piece driver module further comprising a PCB cavity, wherein said PCB and said crossover circuit are at least partially housed within said PCB cavity.

15. The custom-fit IEM of claim 13, further comprising a plurality of barbed stand-offs attached to a surface of said single piece driver module, wherein said PCB and said crossover circuit are mounted to said single piece driver module by said plurality of barbed stand-offs.

16. The custom-fit IEM of claim 13, further comprising a plurality of PCB mounting clips attached to a surface of said single piece driver module, wherein said PCB and said crossover circuit are mounted to said single piece driver module by said plurality of PCB mounting clips.

17. The custom-fit IEM of claim 1, said single piece driver module further comprising at least one locking feature configured to capture and hold said single piece driver module within said custom-fit ear mold shell.

18. The custom-fit IEM of claim 17, wherein said at least one locking feature is comprised of a locking barb integrated onto an outer surface of said acoustic output member.

19. The custom-fit IEM of claim 1, wherein said acoustic output member includes a first sound bore acoustically coupled to a first of said plurality of driver ports via a first duct of said plurality of sound ducts within said single piece driver module, and wherein said acoustic output member includes a second sound bore acoustically coupled to a second of said plurality of driver ports via a second duct of said plurality of sound ducts within said single piece driver module.

20. The custom-fit IEM of claim 19, wherein said second sound bore of said acoustic output member is acoustically coupled to a third of said plurality of driver ports via a third duct of said plurality of sound ducts within said single piece driver module.

21. The custom-fit IEM of claim 20, wherein a first driver of said plurality of drivers is coupled to said first driver port, wherein a second driver of said plurality of drivers is coupled to said second driver port, wherein a third driver of said plurality of drivers is coupled to said third driver port, wherein said first driver is a high-frequency driver, wherein said second driver is a mid-frequency driver, and wherein said third driver is a low-frequency driver.

22. The custom-fit IEM of claim 19, wherein said first sound bore and said second sound bore are concentric.

23. The custom-fit IEM of claim 19, wherein said first sound bore has a first circular cross-section and said second sound bore has a second circular cross-section.

24. The custom-fit IEM of claim 23, wherein said first circular cross-section is larger than said second circular cross-section.

25. The custom-fit IEM of claim 19, wherein said first sound bore has a shaped, non-circular cross-section and said second sound bore has a circular cross-section.

26. The custom-fit IEM of claim 19, wherein said first sound bore has a first shaped, non-circular cross-section and said second sound bore has a second shaped, non-circular cross-section.

27. The custom-fit IEM of claim 1, further comprising an acoustic output extension, wherein said acoustic output extension is slidably mounted to said acoustic output member, and wherein said acoustic output extension is adjustable between a non-extended position and an extended position.

28. An in-ear-monitor (IEM) driver component configured to fit within an IEM shell, comprising:
   a single piece driver module, said single piece driver module comprising:
      a plurality of driver ports configured to be coupled to a plurality of drivers, wherein at least one of said plurality of driver ports is comprised of a first hollow member that extends away from a body portion of said single piece driver module, and wherein at least one of said plurality of driver ports is comprised of a cavity formed within said body portion of said single piece driver module and configured to accept at least a portion of at least one of said plurality of drivers; and
      an acoustic output member, wherein said acoustic output member extends away from said body portion of said single piece driver module, wherein said acoustic output member includes at least one sound bore configured to be acoustically coupled to an acoustic output surface of said IEM shell, and wherein said at least one sound bore is acoustically coupled via a plurality of sound ducts within said body portion of said single piece driver module to said plurality of driver ports.

29. The IEM driver component of claim 28, wherein a second driver port of said plurality of driver ports is comprised of a second hollow member that extends away from said body portion of said single piece driver module.

30. The IEM driver component of claim 28, wherein said body portion of said single piece driver module is fabricated from a rigid material and wherein said first hollow member and said acoustic output member are fabricated from a pliable material.

31. The IEM driver component of claim 30, wherein said rigid material is comprised of a plastic material and said pliable material is selected from the group of elastomeric materials consisting of silicone, neoprene, ethylene propylene diene monomer, nitrile rubber, nitrile, polyvinyl chloride, nitrile/PVC blends, and urethane.

32. The IEM driver component of claim 28, wherein said single piece driver module including said body portion, said plurality of driver ports and said acoustic output member are fabricated from a pliable material.

33. The IEM driver component of claim 32, wherein said pliable material is selected from the group of elastomeric materials consisting of silicone, neoprene, ethylene propylene diene monomer, nitrile rubber, nitrile, polyvinyl chloride, nitrile/PVC blends, and urethane.

34. The IEM driver component of claim 28, said single piece driver module further comprising at least one locking feature integrated onto an outer surface of said single piece driver module and configured to capture and hold said single piece driver module within said IEM shell.

35. The IEM driver component of claim 28, wherein said acoustic output member includes a first sound bore acoustically coupled to a first of said plurality of driver ports via a first duct of said plurality of sound ducts within said single piece driver module, and wherein said acoustic output member includes a second sound bore acoustically coupled to a second of said plurality of driver ports via a second duct of said plurality of sound ducts within said single piece driver module.

36. The IEM driver component of claim 28, further comprising an acoustic output extension, wherein said acoustic output extension is slidably mounted to said acoustic output member, and wherein said acoustic output extension is adjustable between a non-extended position and an extended position.

37. The IEM driver component of claim 28, wherein said single piece driver module is configurable by blocking off one of said plurality of driver ports of said single piece driver module.

38. The custom-fit IEM of claim 2, wherein a second driver port of said plurality of driver ports is comprised of a second hollow member that extends away from said body portion of said single piece driver module.

39. The custom-fit IEM of claim 2, wherein at least one of said plurality of driver ports is comprised of a cavity formed within said body portion of said single piece driver module, and wherein at least one of said plurality of drivers is at least partially disposed within said cavity.

40. The custom-fit IEM of claim 2, further comprising a cable socket integrated into said custom-fit ear mold shell, wherein a source input cable coupleable to said audio source is attached to said custom-fit IEM and to said crossover circuit via said cable socket.

41. The custom-fit IEM of claim 40, wherein said crossover circuit is integrated into said cable socket.

42. The custom-fit IEM of claim 2, wherein said body portion of said single piece driver module is fabricated from a rigid material and wherein said first hollow member and said acoustic output member are fabricated from a pliable material.

43. The custom-fit IEM of claim 42, wherein said rigid material is comprised of a plastic material.

44. The custom-fit IEM of claim 42, wherein said pliable material is selected from the group of elastomeric materials consisting of silicone, neoprene, ethylene propylene diene monomer, nitrile rubber, nitrile, polyvinyl chloride, nitrile/PVC blends, and urethane.

45. The custom-fit IEM of claim 2, wherein said single piece driver module including said body portion, said plurality of driver ports and said acoustic output member are fabricated from a pliable material.

46. The custom-fit IEM of claim 45, wherein said pliable material is selected from the group of elastomeric materials consisting of silicone, neoprene, ethylene propylene diene monomer, nitrile rubber, nitrile, polyvinyl chloride, nitrile/PVC blends, and urethane.

47. The custom-fit IEM of claim 2, wherein a second driver port of said plurality of driver ports is comprised of a second hollow member that extends away from said body portion of said single piece driver module and is acoustically coupled to an ambient environment.

48. The custom-fit IEM of claim 2, further comprising a printed circuit board (PCB), wherein said crossover circuit is contained on said PCB.

49. The custom-fit IEM of claim 48, said single piece driver module further comprising a PCB cavity, wherein said PCB and said crossover circuit are at least partially housed within said PCB cavity.

50. The custom-fit IEM of claim 48, further comprising a plurality of barbed stand-offs attached to a surface of said single piece driver module, wherein said PCB and said crossover circuit are mounted to said single piece driver module by said plurality of barbed stand-offs.

51. The custom-fit IEM of claim 48, further comprising a plurality of PCB mounting clips attached to a surface of said single piece driver module, wherein said PCB and said crossover circuit are mounted to said single piece driver module by said plurality of PCB mounting clips.

52. The custom-fit IEM of claim 2, said single piece driver module further comprising at least one locking feature configured to capture and hold said single piece driver module within said custom-fit ear mold shell.

53. The custom-fit IEM of claim 52, wherein said at least one locking feature is comprised of a locking barb integrated onto an outer surface of said acoustic output member.

54. The custom-fit IEM of claim 2, wherein said acoustic output member includes a first sound bore acoustically coupled to a first of said plurality of driver ports via a first duct of said plurality of sound ducts within said single piece driver module, and wherein said acoustic output member includes a second sound bore acoustically coupled to a second of said plurality of driver ports via a second duct of said plurality of sound ducts within said single piece driver module.

55. The custom-fit IEM of claim 54, wherein said second sound bore of said acoustic output member is acoustically coupled to a third of said plurality of driver ports via a third duct of said plurality of sound ducts within said single piece driver module.

56. The custom-fit IEM of claim 55, wherein a first driver of said plurality of drivers is coupled to said first driver port, wherein a second driver of said plurality of drivers is coupled to said second driver port, wherein a third driver of said plurality of drivers is coupled to said third driver port, wherein said first driver is a high-frequency driver, wherein said second driver is a mid-frequency driver, and wherein said third driver is a low-frequency driver.

57. The custom-fit IEM of claim 54, wherein said first sound bore and said second sound bore are concentric.

58. The custom-fit IEM of claim 54, wherein said first sound bore has a first circular cross-section and said second sound bore has a second circular cross-section.

59. The custom-fit IEM of claim 48, wherein said first circular cross-section is larger than said second circular cross-section.

60. The custom-fit IEM of claim 54, wherein said first sound bore has a shaped, non-circular cross-section and said second sound bore has a circular cross-section.

61. The custom-fit IEM of claim 54, wherein said first sound bore has a first shaped, non-circular cross-section and said second sound bore has a second shaped, non-circular cross-section.

62. The custom-fit IEM of claim 2, further comprising an acoustic output extension, wherein said acoustic output extension is slidably mounted to said acoustic output member, and wherein said acoustic output extension is adjustable between a non-extended position and an extended position.

\* \* \* \* \*